United States Patent [19]

Porter

[11] Patent Number: 4,643,900
[45] Date of Patent: Feb. 17, 1987

[54] METHOD FOR MAKING BAKERY PRODUCTS

[75] Inventor: Roy W. Porter, Dixon, Calif.

[73] Assignee: Basic American Foods, San Francisco, Calif.

[21] Appl. No.: 661,707

[22] Filed: Oct. 17, 1984

[51] Int. Cl.$^4$ .............................................. A21D 2/36
[52] U.S. Cl. ..................................... 426/21; 426/658; 426/549; 426/19
[58] Field of Search .................. 426/549, 653, 19, 21, 426/62

[56] References Cited

U.S. PATENT DOCUMENTS

| | | |
|---|---|---|
| 2,883,285 | 4/1959 | Lubig . |
| 3,053,666 | 9/1962 | Henika et al. . |
| 3,537,863 | 11/1970 | Sinnott . |
| 3,556,805 | 1/1971 | Conn et al. . |
| 3,594,181 | 7/1971 | Alpin . |
| 3,595,671 | 7/1971 | Cooke et al. . |
| 3,615,679 | 10/1971 | Tangel et al. . |
| 3,617,305 | 11/1971 | Rolland . |
| 3,667,963 | 6/1972 | Katter et al. . |
| 3,679,433 | 7/1972 | Pomeranz et al. . |
| 3,803,326 | 4/1974 | Craig et al. . |
| 3,876,815 | 4/1975 | Kurzuis . |

OTHER PUBLICATIONS

Furia et al, Fenaroli's Handbook of Flavor Ingredients, vol. I, 2nd ed., 1975, CRC Press: Cleveland, pp. 196–197.
Pruthi Spices and Condiments, 1980, Academic Press: New York, pp. 200–201.

*Primary Examiner*—Joseph Golian
*Attorney, Agent, or Firm*—Sandler & Greenblum

[57] ABSTRACT

A method for producing bakery products is provided wherein a dough conditioner composition of allium material is incorporated into dough formulations including flour, water and leavening agents. The allium material is used in effective amounts to function in reducing the mix-time required to develop a dough, increasing the absorption of water by the flour during dough development, and increasing the extensibility of the dough. The preferred allium material used in the preparation of the dough improving composition is garlic, more preferably in a dehydrated form and in combination with an inert organic material. The developed dough is processed using conventional techniques and procedures including baking into a standard bakery products such as bread, crackers, pizza and sweet goods.

12 Claims, No Drawings

METHOD FOR MAKING BAKERY PRODUCTS

BACKGROUND OF THE INVENTION

1. Field of the Invention

The present invention relates to farinaceous and amylaceous products. In general, it is directed to improvements in the production of batter and dough products. The invention involves the use of a natural food material as an active agent. More particularly, it involves the incorporation of allium material, preferably dehydrated garlic, as a dough conditioner into standard dough formulations in amounts effective in functioning to reduce the mix-time required to develop a dough. In addition dehydrated garlic increases absorption of water by the flour during dough development, and improves the extensibility of the dough. Upon subsequent processing and baking, the resultant product exhibits organoleptic characteristics generally expected of such products.

2. Description of the Prior Art

Flour-base dough products, such as bread, are one of the basic food groups of a good, nutritional, well-balanced diet. The art of bread-making has been practiced for thousands of years. Raised bread and similar bakery products are normally prepared from a dough containing wheat flour, water, leavening agents, such as yeast and yeast nutrients, and additionally shortening, and salt. The dough ingredients are mixed, fermented and kneaded until a viscoelastic dough is developed prior to baking. This basic bakery method, commonly referred to as the "straight-dough" method, was initially used by bakeries to commercially produce bread and rolls.

The industry uses what is referred to as a "no-time" straight-dough system to commercially produce pizza and certain crackers. In such cases, it is prevalent to use reducing agents as dough conditioners. Sodium sulfite and L-cysteine are routinely used at relatively high concentrations to accelerate the development of the dough Currently in the United States most bread and rolls are produced by the sponge-dough method wherein the fermentation of the sponge is utilized to mellow the gluten to where it can be mixed and fully developed in a reasonable time and yet exhibits acceptable extensibility for purposes of machining volume purposes.

Oxidizing agents are commonly employed in conventional bread and roll production to fix the volume obtained during proofing and baking. Protease enzymes, L-Cysteine and sodium sulfite are typically used to modify the gluten of dough in order to reduce mix-time and increase the extensibility of the dough.

There has been considerable effort devoted to shortening the overall time required for bread preparation and reducing the number and inconvenience of the operating steps in commercial baking procedures. In what is commonly referred to as "continuous-mix" baking operations, the prefermentation step is substantially reduced or eliminated from the "straight" and "sponge-dough" methods. In commercial practice, continuous-mix processes were initially effected using machinery manufactured by Wallace and Tierman Inc., referred to as the Do-Maker Equipment, or by Bakery Machinery Division, American Machine and Foundry Company, referred to as the Amflow Equipment. The next major commercial development was what is known as the Chorleywood Process developed in England. The last of the major commercial, mechanical dough development processes was introduced about 20 years ago to the baking industry by the Bread Research Institute of Australia with their Brimee Mixer.

Since then, most of the effort expended in attempting to improve dough-making have concentrated on methods for chemically developing the dough. One of the first of such chemical modification methods which was put into commercial practice is disclosed in U.S. Pat. No. 3,053,666 and involves the use of certain reducing compounds, such as cysteine compounds, glutathione and sodium bisulfite, as activating agents. All of these compounds are sulphur-containing reducing agents. Small amounts of one or more of these agents were found to be effective in accelerating the development of proper dough consistency and to improve the extensibility of the dough. Compounds related or homologous thereto were also found to be effective. In addition, materials such as inactive dry yeast, unheated soy flour, etc., were found to be useful as sources of cysteine and/or glutathione. In combination with such compounds, conventional oxidizing agents, such as potassium bromate, were used as maturing agents. It was found that the combination of such agents was necessary in order to obtain optimum extensibility and gas retention with good loaf volume and grain quality in a process for mixing a dough without a fermentation step.

Since the introduction of the Reddi-Sponge TM product, there have been numerous attempts using various chemical compounds to improve dough making. In accordance with the disclosure of U.S. Pat. No. 3,556,805, compositions comprising fumaric acid, salts thereof or an ester of fumaric acid having from five to nine carbon atoms are disclosed as reducing the mixing requirements in the development of bread dough.

U.S. Pat. No. 3,617,305 relates to an additive composition comprising defined amounts of an ascorbate compound, an edible oxidizing agent and an edible sulfhydryl containing reducing agent for use in yeast-raised dough products.

U.S. Pat. No. 3,876,805 is directed to improved whey protein concentrates, both water soluble and gluten reactive, which are particularly suitable for use in the bakery industry as dough developers and conditioners.

U.S. Pat. No. 3,595,671 is also directed to reducing the mixing time in continuous dough-making processes by the use of defined amounts of chemical additives in the form of a combination of an acceptable food grade sulfhydryl-containing reducing agent, anti-oxidant, and oxidizing improver, respectively, preferred to be L-Cysteine hydrochloride, isoascorbic acid and a bromate.

Although each of these processes has been more or less successful in commercial procedures for making bread, there has been a growing aversion to and concern for the use of chemical additives, particularly those containing sodium and sulfites, in processed foods.

Prior attempts to use natural food materials as improving agents for dough products are exemplified by U.S. Pat. No. 3,594,181 which discloses that comminuted non-toxic plants of the Cruciferae, Resedaceae, Capparidaceae, or Tropacolaceae families are useful as a cysteine substitute.

Along this line, U.S. Pat. No. 2,819,168 is directed to incorporating the separated germ or husk of raw, leguminous seeds or an extract of the germ or husk into one or more of the substances employed in carrying out the production of bread.

U.S. Pat. No. 1,479,592, discloses the addition of onions to yeast fermentation during formation of the yeast. It is believed that by doing so the life of the yeast is extended without an excessive growth of bacteria therein. It is disclosed that boiled onions are added to sour dough which is allowed to stand for a time during which spontaneous fermentation will continue in the dough with the onions acting as an agent to retard the activity of the growth of the yeast to thereby form a yeast which will remain active for extended periods of time.

U.S. Pat. No. 3,679,433, discloses the addition of small amounts of naturally occurring or synthetic glycolipids to dough formulations containing added protein concentrates from plant or animal sources. This is done to permit the enrichment of baked products with high levels of protein concentrates and thereby improve the baking qualities thereof.

U.S. Pat. No. 3,803,326, discloses a process for bread making involving the addition of a composition consisting of a mixture of amino acid reducing substances containing free sulfhydryl groups, dried whey, ascorbic acid and dried soya protein to conventional dough ingredients. It is disclosed that materials such as inactive dry yeast, unheated soya flour, or other natural foods may be used as sources of cysteine and/or glutathione.

Related to such concern for the use of natural ingredients in bread-like baked goods, U.S. Pat. No. 2,883,285 discloses a procedure comprising fermenting a mixture of ground cereal, water, plant extract material and flour, which has been subjected to elevated temperatures of 100° C. while being exposed to radiation. Phosphatides, preferably provided by the juice of onions and garlic, may be added to the mixture being fermented, which is thereafter extruded into molds and baked at 160° C. for about four hours to result with a bread-like baked goods product.

Garlic, however, is normally considered to be a food which is often included in dough products, such as bread and the like, as a flavor ingredient. Representative of such use of garlic as flavoring is U.S. Pat. No. 3,615,679, which includes garlic in a pizza dough which is partially baked, and then frozen. The frozen pizza is capable of preparation for consumption in a toaster.

U.S. Pat. No. 3,667,963, is directed to a pizza, or similar food product, prepared by slicing a baked roll and applying a sealing layer of garlic-flavored margarine to the soft interior surface of the roll.

U.S. Pat. No. 3,876,815, relates to a process for making pretzels. It is disclosed that onions can be used to flavor the dough used in making soft pretzels.

U.S. Pat. No. 3,537,863, is directed to a method of making garlic bread in which the garlic flavor is preserved during baking. It is disclosed that a critical step in the preservation of the garlic flavor is to add the garlic at about the time of kneading after all other ingredients have been mixed together and just prior to baking. Another critical factor is that the garlic should be added in a dry form. The disclosed theory of this action is that the flavor of the dry, dehydrated garlic is activated by the moisture or steam created during the baking process so that the development of flavor is complete at the same time that the baking is completed. The bread is disclosed as coming from the oven with full, fresh garlic flavor which is evenly distributed throughout the entire loaf. The term garlic "chips" is defined as including dehydrated, dry garlic flakes and dehydrated, dry minced garlic, but does not include garlic powder or the like. The preferred amount of garlic chips to be added is two tablespoons ($\frac{1}{8}$ of a cup) which equates to about $\frac{1}{8}$ of the volume of starter.

Notwithstanding such use of garlic material as a flavoring material in making various foods including garlic bread, it is not believed that allium material has heretofore been used as a dough additive to reduce the mix-time of dough development and increase the extensibility of the dough, in a manner similar to cysteine, glutathione, protease enzymes, sulfites and other recognized agents for such purposes.

SUMMARY OF THE INVENTION

The present invention is primarily directed to the use of allium material as a dough developer and conditioner in reducing the mixing time required to fully develop the gluten during dough formation, providing a conditioning of the dough to give it better handling and machining properties, as well as improved extensibility, without adversely affecting volume, grain, texture, symmetry and overall appearance in the resultant bread or baked goods product.

As previously discussed, baking procedures may require either prolonged fermentation and/or manipulation to develop essential dough characteristics, or the use of excessive mechanical force or artificial and synthetic chemical additives to obtain desired dough viscosities and a rapid development of the dough. In contrast, the present invention involves the discovery of heretofore unrecognized properties in certain naturally occurring food materials which function in a similar manner to known developing and conditioning dough additives.

The advantages of the present invention are realized by using an additive which is derived from naturally occurring materials of recognized edibility acceptable to consumers. These materials are particularly useful in procedures and compositions used in the production of baked goods. More particularly, it has been discovered that allium material is an effective additive which functions as an active agent at least as well as various artificial or synthetic chemical compounds commonly incorporated into dough for their conditioning and mix-time reducing effect.

Onion and garlic, notably the latter, have been found to be particularly suitable allium material for use in the process of the present invention. Although freshly ground, crushed tissue or juice may be used, particularly good results are achieved when a dehydrated allium product, such as dehydrated garlic granules, powder or agglomerates, is used.

The present invention thus finds utility in modifying any conventional dough development procedure including straight or sponge-dough techniques, as well as brew or broth methods.

The present invention, however, is also useful in the production of all types of farinaceous and amylaceous products.

Thus, an object of the present invention is the provision of an ingredient mix containing farinaceous and amylaceous materials and a functional amount of allium material.

A further object of the present invention is the provision of a dry mix, including farinaceous and amylaceous materials, and a functional amount of allium material, for use in making batter and dough products.

Another object of the present invention is a method for making batter or dough products from a mix containing farinaceous and amylaceous materials, a functional amount of allium material and water.

And yet a further object of the present invention is a method of using functional amounts of allium material in the production of products including biscuits, muffins, such as English muffins, buns, rolls, crackers, pretzels, pizza shells or crust, pie dough, wheat flour tortillas, sweet goods, cake, cookies, pastry, puffed pastry, croissants, bread-sticks, pancakes, waffles and pasta products, in addition to various kinds of breads and the like.

The present invention preferably results with a flour-base dough product comprising an additive made from allium material in an amount effective to function as a dough improver preferably without contributing a noticeably perceptible flavor to the product. Although it has been discovered that dehydrated garlic when used in an amount in the range of up to about 0.5% by weight of flour, and preferably up to about 0.3% by weight flour is an effective amount to achieve the aforementioned results, it is more preferred to include dehydrated garlic in the range of about 0.01 to 0.3% by weight of flour. The most preferred range of dehydrated garlic which is functional in reducing the mixtime to fully develop doughs is 0.01 to 0.05% by weight of flour whereas 0.05 to 0.25% by weight of flour is most preferred for improving the extensibility of the dough.

The processing and handling characteristics of dehydrated garlic are improved for purposes of the present invention when the garlic is formed into a composition with an inert material such as a diluent or carrier. Organic materials such as malto-dextrin or wheat starch are preferred for such purpose. The composition may be formed by dry-blending or co-drying the garlic and the inert material in desired proportions. Proportions of dehydrated garlic to malto-dextrin or wheat starch in the composition may range from 1:9 to 9:1 with 1:1 to 1:7 being a preferred range.

DETAILED DESCRIPTION OF THE INVENTION

The present invention shall be described in detail for the preparation of bakery dough products such as bread. Regardless of the process used in the preparation of such products, it is critical to properly develop the dough. This is primarily a result of the protein of wheat flour, which is gluten, becoming hydrated and forming elastic films. Wetting the flour during dough-making permits the gluten protein to absorb water and to swell thereby weakening some of the intermolecular forces holding the adjacent protein chains together. As mixing proceeds, the protein chains are stretched and unwound and by means of interchange reactions between disulfide bonds under stress and adjacent sulfhydryl groups, a network of protein chains is developed.

The formation of this network in conventional bread making procedures, such as those using yeast fermentation, proceeds during mixing and fermentation until the dough is properly developed, i.e., until optimum gas retention properties are achieved. This is effected by the resultant elastic films which entrap the gas evolved by the leavening process which causes the bread to raise as the gas expands. As fermentation proceeds, the dough becomes extensible and elastic so that the resultant film can hold entrapped gases in the form of bubbles which do not coalesce during the rapid expansion which occurs during baking. In order for a dough to develop, a mixture of dough ingredients is normally subjected to prolonged mixing and kneading steps. During the process of kneading, which is effected by a deliberate and regular action, the yeast is evenly distributed and the dough developed so as to give a uniform, texturized final product. Conventionally, the dough so obtained is permitted to ferment and to expand for prolonged periods of time, commonly on the order of two to three hours or longer.

In addition to the modification of the physical properties of dough to improve its ability to hold gas during baking, and the production of the gas to raise and leaven the loaf, it is generally recognized that bulk fermentation is also responsible for the formation of fermentation products which contribute to the flavor of the bread.

After the initial or bulk fermentation, the dough batch is usually punched three times at about 50-minute intervals and scaled or divided into individual units for make-up into loaves, rolls, buns and the like. This basic method of dough development is commonly referred to as the "straight-dough" method.

The "sponge-dough" method initially forms what is commonly referred to as a "sponge", from a mixture of a portion of the dough ingredients, which is permitted to ferment. After the desired degree of fermentation is effected, the sponge is mixed with remaining dough ingredients for further processing much the same as in the straight dough method subsequent to fermentation. The primary advantage of the sponge-dough method in comparison with the straight-dough method is that it produces a bread which is generally recognized as manifesting superior quality.

A method allowing continuous dough preparation involves first forming a broth or brew from a mixture of ingredients including water, sugar, yeast, yeast nutrients, buffering agents and vitamin enrichment agents. The mix may also include a small amount of flour and non-fat dry milk. After the broth is prepared, it is fermented for about two and one-half hours and then pumped to a blender where it is mildly mixed with flour, fat and oxidizing agents in desired proportions. Mixing is on a continuous basis. The resultant loosely mixed batter is pumped to a mixer where the dough is forced through an aperture within which an agitator is operated at high speeds to thoroughly mix all of the ingredients and to completely hydrate and develop the protein or the gluten of the flour. Typically, a dough structure is developed in a continuous-mix operation within 30-90 seconds thereby completely eliminating the slow hydration of gluten which normally requires a four to five hour prefermentation step in the more conventional batch-type bread making processes.

The present invention is particularly applicable to the dough development stage of conventional baking procedures although dehydrated garlic also functions in accordance with the objects of the present invention when added to the ingredients during formation of the sponge or the broth.

For the purposes of the present invention, allium material such as dehydrated garlic is added to an otherwise standard formulation made up of the usual amounts and types of ingredients, preferably including leavening agents. The difference from conventional formulations, however, is the use of allium material in amounts effective to function as a dough conditioner without imparting perceptible taste to the product.

It has been discovered that the use of allium material in amounts up to about 0.5% by weight of the flour component of the formulation is effective in functioning in this way. The allium material functions as a dough conditioner by increasing the absorption of water by the flour as well as softening and enhancing the machinability of the dough. Its preferred use, however, is to reduce the mix-time of dough development as well as to increase the extensibility of the dough. In these respects, allium may be used to suplement or preferably replace conventional dough conditioning and reducing agents such as cysteine, glutathione, sodium sulfite, sodium bi-sulfite, sodium meta bi-sulfite, and protease enzymes conventionally used in the baking industry for similar purposes.

The allium material preferred for purposes of the present invention is garlic. It has been found that dehydrated garlic in particulate form such as powder, granules, or agglomerates thereof is most preferred. The dehydrated garlic used in the present invention can be produced using any of the conventional dehydration procedures which are commonly employed by the industry in making such products. Dehydrated garlic products sold by the owner of the present application under its BASIC ® brands is particularly suitable for purpose of the present invention. For example, dehydrated garlic is typically produced by first dividing garlic cloves into slices which are dried to a moisture content of about 12% prior to grinding to produce a dehydrated granular or powdered garlic product having a moisture content of less than about 7-10%. Processes for the production of dehydrated garlic are disclosed in U.S. Pat. Nos. 3,258,343, 3,259,504 and 3,378,380.

A preferred dehydrated garlic for purposes of the present invention is manufactured and sold by the owner of the present application under its SUN-SPICED ™ brand. The method for its production includes grinding garlic cloves into a puree maintained at a temperature of less than about 85° F. prior to dehydration by a procedure involving spraying the garlic puree into a drying chamber wherein droplets of puree are exposed to elevated temperatures to reduce their moisture content to within the range of about 8-15%, and ultimately to less than about 7½%. The resultant product is then subjected to size modification by conventional means effective for such purpose to produce particles including powder, granules and agglomerates.

The use of dehydrated garlic in amounts up to about 0.5% by weight of flour have been found to be effective and functional for purposes of the present invention, with amounts up to about 0.3% being preferred, without imparting perceptible flavor to the dough product. It is more preferred to use dehydrated garlic in dough formulations for bread, rolls, muffins, sweet goods and the like in effective amounts within the range of 0.01 to 0.25% by weight flour. In dough formulations for pizza, crackers and similar goods where a greater degree of extensibility is desired, it is more preferred to include effective amounts of dehydrated garlic in the range of about 0.05 to 0.5% by weight flour to result with a product having desired characteristics.

Inasmuch as some a perceptible garlic flavor is objectionable for some bakery products, it is preferred to use allium material which has been treated so as to substantially eliminate its characteristic odor and flavor prior to inclusion with dough ingredients in these instances. To this end, allium material is subjected to a treatment to permanently inactivate the flavor-forming components present in its tissue cells before the tissue is processed into a dehydrated product. In this regard, whole allium material, such as garlic, is subjected to heat in order to elevate the temperature within the tissue preferably to above about 190° F. prior to subdividing the tissue into a preferred form of a puree, piece or particulate material which may then be subjected to dehydration techniques to reduce the moisture content thereof to less than about 15%. Dehydrated garlic in particulate form, such as powder, granules and agglomerates having a moisture content within the range of about 3-7½%, which is substantially devoid of flavor and odor, is preferred for purposes of the present invention from this standpoint.

It is also preferred to use an additive comprising a composition of allium material and a material inert for purposes of the present invention. Preferred inert materials for the composition include organic materials such as malto-dextrin, wheat starch, flour, and similar diluent and carrier materials which do not have a functional effect for purposes of the present invention. The composition of allium material and inert material can be prepared by conventional dry-blending techniques or by co-drying procedures. As to the latter procedure, suitable inert material can be mixed with the garlic puree prior to spray-drying in the production of dehydrated garlic as previously described. The ratio of allium material to inert material in the composition may range from between 1:9 to 9:1. A more preferred dough improver composition is formulated to have dehydrated garlic and malto-dextrin in a ratio within the range of 1:1 to 1:7. An advantage of such a dough improver composition is enhanced metering and processing tolerances.

As used herein, the term "fermentation" includes all changes in the dough as a result of the action of yeast or chemical agents which function to aerate or otherwise leaven the dough and develop the gluten in the dough. For purposes herein, "resting" and "benching" are used interchangeably to denote periods of time allowed to give the gluten in the dough time to recover from any steps such as dividing, molding, forming, etc., wherein the dough has been stretched or worked. The term "proofing" is usually the next to the last step in any commercial baking operation which precedes the baking step itself. In addition to yeast, a number of other compounds or mixtures of compounds which effectively produce carbon dioxide gas to aerate the dough of baked products qualify as "leavening agents".

A batter or dough is prepared from essential dough ingredients consisting of flour and water. In addition to these, leavening agents are essential ingredients of raised dough products. Shortenings, milk, sugar and salt are also normally used in preparing such products. Doughs as well as batters can also include extraneous ingredients such as raisins, nuts, berries, bran and meals from various grains and like products which can be incorporated into standard formulations for baking as well as other ingredients and additives commonly used in the baking industry.

Although wheat flour is the preferred farinaceous material for purposes of the present invention, any of the conventional types of flour commonly used in the baking trade, such as rye, corn, potato, rice and the like can be used. It is critical, however, that neither the flour used nor the dough made therefrom be subjected to any physical or chemical treatment prior to baking which would denature the gluten or protein content thereof. Otherwise the dough would be incapable of being fully developed to have the requisite characteristics commonly expected for raised dough products.

For purposes herein, all amounts and percentages of ingredients including water are expressed by weight based on the farinaceous material being 100%, i.e., (f.b.). Based on flour being 100%, dough formulations which yield acceptable products generally comprise flour, 100%; water 50-85%; and allium, up to 0.5%. Other ingredients which may be used include salt, 0-3%; sugar, 0-20%; shortening, 0-50%; yeast, 1-8.0%; milk or milk substitute, 0-5%; as well as sufficient amounts of preservatives, color enhancers, flavoring, spices and the like in accordance with good manufacturing practices. Thus it can be seen that doughs prepared according to the present invention comprise all of the usual dry ingredients, shortenings and leavening agents in amounts conventionally employed in the baking industry. The difference from conventional dough formulations, however, is the use of allium material in amounts effective to function as a dough conditioner without imparting perceptible taste to the product.

The ingredients to be used in the manufacture of products in accordance with the present invention should be mixed together under ambient conditions preferably not exceeding about 90° F. Inasmuch as fermentation occurs as a function of time and temperature, there may be a considerable degree of latitude as to the temperature range used in this step. As previously indicated, however, if the flour or dough is subjected to excessive temperatures, there is a risk that the protein content thereof will become denatured and the dough will be incapable of developing the desired characteristics.

For example, in a sponge-dough technique, flour, water, yeast and yeast nutrients are subjected to a two-stage mixing under ambient conditions to form a sponge which is permitted to ferment for about 3-5 hours and preferably for about 3½ hours at a temperature of in the range of about about 80° to 88° F. and preferably at about 84° to 86° F. The exact time period for fermentation may vary depending upon the type of chemical or yeast leavening agents used and other important factors which are known to affect dough rheology, as those skilled in the art will appreciate. Moreover, it has been discovered that allium material functions equally well whether mixed with the sponge ingredients or after fermentation of the sponge has been effected, by mixing with the dough ingredients which usually include flour, granulated sugar, nonfat dry milk, salt, and shortening, in addition to water. Typically the dough ingredients are mixed with the fermented sponge in a mixing vessel in a two-stage procedure to complete the development of the dough.

The fully developed dough is then permitted a rest period prior to being subjected to conventional steps employed in the baking industry for forming dough into products such as bread loaves, rolls, buns or other unit configurations by dividing, rounding, benching, molding and panning the dough. After the dough has been formed into the desired unit configuration, it is permitted to proof for a short period of time during which additional carbon dioxide is generated to raise the dough so that when it is baked it will have obtained its desired volume.

Baking of dough for bread is typically conducted for about 16 minutes at a temperature of about 450° F. for a one pound loaf of bread. During baking, the dough expands to the desired loaf volume.

In a straight-dough process, however, all the ingredients, including an effective amount of allium material, are mixed together in one stage. In this procedure, it is preferred to mix the dry ingredients with the water until thoroughly dissolved, and then draw in the flour and continue mixing until most of the water has been absorbed. The leavening agent is then added and the dough mixing is completed. The mixed dough is then permitted to ferment and is subsequently processed using standard procedures normally employed in the industry for making bakery products, such as those described above.

The following examples are presented to illustrate the various advantages of the present invention.

EXAMPLE I

A comparison of the effects of including dehydrated garlic and conventional dough conditioning agents on reducing the mixing time requirements for complete dough development was made using three conventional bread-making procedures: Sponge-Dough, 40% Flour Ferment, and Straight-Dough methods. In each case, batches of bread were made using a typical bread flour, i.e. Sunny Kansas Flour, having a protein content of 11.0%, and Seal of Minnesota Flour (12.6% protein) considered to be a high protein flour. In the Sponge-Dough and 40% Flour Ferment procedures, the dough conditioners were mixed with the ingredients during the Sponge and Preferment stages of some batches, respectively, and in the Dough stages of others to compare the effectiveness thereof. The Straight-Dough method was carried out not only using a regular or 80-minute fermentation, but also using a "short-time" fermentation of 20 minutes. The formulations and procedures otherwise used in each case are listed below:

TABLE 1-A

| WHITE PAN BREAD Sponge-Dough Formulation | |
|---|---|
| Ingredients | Grams |
| Sponge: | |
| Bread Flour | 700 |
| Ammonium Chloride Solution (10%) | 4 |
| Potassium Bromate Solution (5 ppm) | 0.46 |
| Instant Yeast, SAF | 10 |
| Water, | 420 |
| Dough: | |
| Bread Flour | 300 |
| Granulated Sugar | 60 |
| Nonfat Dry Milk | 20 |
| Salt | 20 |
| Bread Shortening, Trico | 30 |
| Water, and Ice | 192 |
| Total Dough Weight | 1,756.46 |

The above formulation of ingredients was used in the preparation of each batch of white pan bread for purposes of the following comparisons. The only modification to this formulation was the inclusion of BASIC ® dehydrated garlic powders, L-cysteine, Reduce 150, Protease and Reddi-Sponge ® dough conditioner on a percent by weight of flour basis to the sponge or the dough as indicated in the tables below.

For purposes of these comparisons, a typical Sponge-Dough technique was used to develop each dough batch. The specific sponge-dough procedure involved mixing the sponge ingredients in an A-200 Hobart Mixer with McDuffy mixing bowl for 1 minute at low speed and 1 minute at medium speed preliminary to fermenting the resultant sponge for about 4 hours at 84°-86° F.

Afterwards the sponge was mixed with the above listed dough ingredients in the preparation of each sample batch. For each batch, the first stage of this mixing was conducted at a low speed setting for 1 minute to sufficiently incorporate the ingredients. The second stage of the mixing at a medium speed setting was carried out to fully develop the dough for the requisite times tabulated below. The endpoint for mixing was judged subjectively by the extensibility and uniformity of the dough structure.

The batches of developed dough were then permitted to ferment for about 10 minutes at about 78°-80° F. before being formed into loaves prior to being proofed and baked in an oven set at 450° F. for about 16 minutes.

TABLE 1-B

WHITE PAN BREAD
40% Flour Ferment
Formulation

| Ingredients | Grams |
|---|---|
| Pre-Ferment: | |
| Bread Flour | 600 |
| Granulated Sugar | 15 |
| Salt | 7.5 |
| Ammonuim Chloride Solution (10%) | 6 |
| Potassium Bromate Solution (5 ppm) | 0.69 |
| Instant Yeast, SAF | 20 |
| Water | 750 |
| Dough: | |
| Preferment | 923 |
| Bread Flour | 600 |
| Granulated Sugar | 60 |
| Nonfat Dry Milk | 20 |
| Salt | 15 |
| Bread Shortening, Trico | 30 |
| Water and Ice | 122 |
| Total Dough Weight | 1770 |

The formulation listed above was used in the preparation of each batch of bread made for purposes of this test except that BASIC® dehydrated garlic, L-cysteine, Reduce 150, Protease and Reddi-Sponge dough conditioner were included on a percent by weight of flour basis to the preferment or the dough as indicated in the tables which appear below:

The dough batches were prepared by first making the preferment. This involved dry-blending the instant yeast, with the flour, sugar and salt followed by dispersing the dry ingredients in water with a wire whisk into a container. The container was then covered and placed in a water bath held at about 82° F. for 2 hours.

The preferment was then mixed with the dough ingredients in a McDuffy bowl using an A-200 Hobart Mixer. After development of the dough, it was permitted to ferment for about 10 minutes at ambient temperature before being formed into loaves which were proofed prior to baking in an oven at 450° F. for about 16 minutes.

TABLE 1-C

WHITE PAN BREAD
Straight Dough
Formulation

| Ingredients | Grams |
|---|---|
| Flour | 1000 |
| Granulated Sugar | 60 |
| Nonfat Dry Milk | 20 |
| Salt | 20 |
| Bread Shortening, Trico | 30 |
| Instant Yeast, SAF | 15 |
| Water | 631 |
| Total Dough Weight | 1776 |

The above formulation was used to prepare each batch of bread for purposes of these comparisons except that BASIC® dehydrated garlic powders, L-cysteine, Reduce 150, Protease and Reddi-Sponge® dough conditioner were included on a percent by weight flour basis in the dough as indicated in the following tables.

A conventional straight-dough process was used to develope each dough batch. This involved mixing all the ingredients with an A-200 Hobart Mixer in a McDuffy mixing bowl at medium speed for four to 4.5 minutes.

After mixing the dough batches were permitted to ferment for 80 minutes for the regular process or 20 minutes for the "short-time" process at 84°-86° F. before being formed into loaves which were proofed and baked in an oven at 450° F. for about 16 minutes.

The results of the foregoing tests show the effects which dehydrated garlic and conventional dough conditioners have on reducing the mixing time required to fully develope dough in standard bread making procedures. Table 1-D lists these results for bread made in accordance with three different procedures using Sunny Kansas Flour and Table 1-E, using Seal of Minnesota Flour.

TABLE 1-D

| | | Flour Type: SUNNY KANSAS | | | | | |
|---|---|---|---|---|---|---|---|
| | | Bread-making Procedure | | | | | |
| | | Sponge-Dough | | 40% Flour Ferment | | Straight Dough | |
| Dough | Level | Added to: | | Added to: | | 80' | 20' |
| Conditioner | % | Sponge | Dough | Preferm. | Dough | Reg. | Short Time |
| Control | — | 3 | 3 | 3 | 3 | 4.5 | 4 |
| Basic 600-0 | 0.01 | 2.75 | 2 | 2.5 | 2.5 | 3.75 | 3 |
| | 0.1 | 1.5 | 1.5 | 2.25 | 2.25 | 3.25 | 3 |
| | 0.25 | 1 | 1.25 | 2 | 2 | 3.25 | 3.5 |
| Basic 602 | 0.05 | 2.5 | 2 | 2.5 | 2.75 | 3.75 | 3.25 |
| | 0.1 | 1.5 | 1.5 | 2.75 | 2.25 | 3.5 | 3 |
| | 0.25 | 1.25 | 1.75 | 2.5 | 2.5 | 3.5 | 2.75 |
| Reddi-Sponge | 1.0 | 2 | 1.5 | 2.5 | 2.5 | 3 | 2.5 |
| | 1.5 | 1 | 1 | 2 | 2 | 2.25 | 2 |
| L-Cysteine | 30 ppm | 2 | 1.5 | 2.5 | 2.25 | 3 | 2.5 |
| | 45 ppm | 1.5 | 1 | 2.25 | 2.25 | 2.25 | 2 |
| Reduce 150 | 0.5 | 2 | 2 | 2.5 | 2.5 | 3 | 2.25 |
| | 0.75 | 1 | 1.25 | 2 | 2 | 2.25 | 2 |
| Protase | 0.125 | 2.5 | 2 | 2.5 | 2.75 | 3.5 | 3.25 |
| | 0.25 | 1.5 | 1.5 | 2.25 | 2.25 | 3.25 | 3 |

TABLE 1-D-continued

| | | Flour Type: SUNNY KANSAS | | | | | |
|---|---|---|---|---|---|---|---|
| | | Bread-making Procedure | | | | | |
| | | Sponge-Dough | | 40% Flour Ferment | | Straight Dough | |
| Dough | Level | Added to: | | Added to: | | 80' | 20' |
| Conditioner | % | Sponge | Dough | Preferm. | Dough | Reg. | Short Time |
| | 0.5 | 1 | 1.5 | 2.25 | 2.25 | 3.25 | 2.75 |

TABLE 1-E

| | | Flour Type: SEAL OF MINNESOTA | | | | | |
|---|---|---|---|---|---|---|---|
| | | Bread-making Procedure | | | | | |
| | | Sponge-Dough | | 40% Flour Ferment | | Straight Dough | |
| Dough | Level | Added to: | | Added to: | | 80' | 20' |
| Conditioner | % | Sponge | Dough | Preferm. | Dough | Reg. | Short Time |
| Control | — | 3 | 3 | 4 | 4.25 | 4.75 | 4 |
| Basic 600-0 | 0.01 | 2 | 2 | 3.25 | 3.5 | 3.75 | 3.25 |
| | 0.1 | 2 | 1.75 | 3 | 3 | 3.5 | 3 |
| | 0.25 | 1.75 | 1.75 | 2.75 | 3 | 3.25 | 2.75 |
| Basic 602 | 0.05 | 2.5 | 2 | 3.5 | 3.5 | 3.75 | 3.5 |
| | 0.1 | 2 | 1.75 | 3.25 | 3.75 | 3.75 | 3.25 |
| | 0.25 | 1.75 | 1.5 | 3 | 3.5 | 3.5 | 2.75 |
| Reddi-Sponge | 1.0 | 1.75 | 1.75 | 3 | 3.25 | 3.25 | 3 |
| | 1.5 | 1.25 | 1.5 | 2.5 | 2.75 | 3 | 2.5 |
| L-Cysteine | 30 ppm | 1.75 | 1.75 | 3 | 3 | 3.5 | 3 |
| | 45 ppm | 1.5 | 1.5 | 2.75 | 2.5 | 3 | 2.5 |
| Reduce 150 | 0.5 | 2 | 2 | 3.25 | 3.5 | 3.25 | 3 |
| | 0.75 | 1.25 | 1.5 | 2.5 | 3 | 3.25 | 2.25 |
| Protase | 0.125 | 2.25 | 2 | 3.5 | 3.5 | 3.75 | 3.25 |
| | 0.25 | 1.75 | 1.75 | 3.75 | 3 | 3.5 | 3 |
| | 0.5 | 1.5 | 1.5 | 3 | 3.25 | 3.25 | 3.75 |

From the tabulated tests results it can be seen that all dough conditioners including dehydrated garlic powders (BASIC 600 and BASIC 602) were similarly effective in reducing the mix-time required for complete dough development. It does not appear that the functional effect of dehydrated garlic as a dough conditioner is substantially affected by the type of flour used, i.e. high protein or typical bread flour, or at what stage of processing it is mixed with other ingredients, i.e. in the dough or otherwise. In general the overall quality of the bread made using dehydrated garlic as a dough conditioner was judged to be substantially the same as bread made using conventional dough conditioners.

EXAMPLE II

Pizza shells or crusts were produced using a no-time straight dough process which used 3 grams of sodium sulfite per 1000 grams of flour to achieve the desired gluten mellowing with a total mix time of 1 minute at low speed and 3 minutes at high speed in an A-200 Hobart mixer with a McDuffy bowl and fork. Two batches of pizza dough containing 1000 grams of flour each were prepared in an otherwise identical manner except that "SUNSPICED" ™ dehydrated garlic powder at 0.05, 0.075, 0.1, 0.15 and 0.2% by weight of flour, respectively, was substituted for the 0.03% of sodium sulfite in the following formulation:

TABLE 2

| PIZZA FORMULA Formulation | |
|---|---|
| Ingredients | Grams |
| Bread Flour | 1000 |
| Salt | 25 |
| Sweet Dairy Whey | 15 |
| Granulated Sucrose | 30 |
| Calcium Propionate | 5 |
| Baking Soda | 5 |
| Sodium Acid Pyrophosphate 28 | 6 |

TABLE 2-continued

| PIZZA FORMULA Formulation | |
|---|---|
| Ingredients | Grams |
| Monocalcium Phosphate, Anhydrous | 2 |
| Sodium Sulfite | 0.3 |
| Shortening (All-Purpose) | 50 |
| Compressed Yeast | 30 |
| Water | 600 |
| Total Dough Weight | 1768.3 |

After mixing, the dough batches were fermented for over 40 minutes at 86° F. and then taken to a divider for portioning. Subsequently the dough portions were baked in an oven at 430° F. until lightly brown on top.

In comparison, the dough made with dehydrated garlic performed as well as the batch made with sodium sulfite during processing. The baked crusts were judged to be exceptionally uniform in size and shape, having experienced no objectional shrinkage.

EXAMPLE III

Batches of dough were produced using a commercial cracker formulation containing 10,000 grams flour, 0.8 grams bacterial protease, with the remainder comprising standard ingredients used in the cracker industry.

TABLE 3

| Dough Improver | Batch No. | Use Level |
|---|---|---|
| Sodium sulfite | 1 | 1.6 grams |
| SUNSPICED ™ Garlic Powder | 2 | 0.05% (f.b.) |
| SUNSPICED ™ Garlic Powder | 3 | 0.01% (f.b.) |
| Conventional Garlic Powder | 4 | 0.01% (f.b.) |

In the preparation of batch no. 1, 1.6 grams of sodium sulfite was used. For batch nos. 2 and 3, SUN-SPICED ™ dehydrated garlic at levels of 0.05% and 0.01%, respectively, were used in lieu of the sodium sulfite of batch no. 1 in an otherwise standard and identical commercial cracker formulation. In batch no. 4, 0.01% of conventional dehydrated garlic was substituted for the sodium sulfite.

Each dough batch was mixed for about 11 minutes at low speed in a horizontal mixer equipped with a blending arm agitator, after which they were permitted to rest for about 30 minutes before being passed to the make-up line for laminating, sheeting, cutting and baking.

The dough of batch no. 1 was slightly sticky immediately after mixing. After a 30 minute rest period, it was judged to exhibit normal qualities being very short and slightly sticky. Overall processing of the dough was judged to be very good.

As to batch no. 2, the dough appeared to be very similar to that of batch no. 1, although somewhat drier. The overall sheeting properties, however, were judged to be acceptable.

With respect to batch no. 3, the dough was judged to be short and slightly dry immediately after mixing, but exhibited a slightly moist feel after a 30-minute rest period. At the laminator and sheeter, the dough was judged to be only slightly dry.

The dough of batch no. 4 had a slightly short consistency and a moderately wet feel which became slightly more pronounced after a 30-minute rest period. In comparison with the dough of batch no. 1, this dough batch was judged to be slightly dry and short in texture but handled equally as well during laminating, sheeting and stamping.

The foregoing observations indicate that cracker doughs formulated to contain dehydrated garlic absorb more water during development than standard doughs including sodium bisulfite. This was manifested by their slightly dryer texture. Increased absorption is an advantage in that this phenomenon results with an increase in yield. In other respects, the organoleptic characteristics of the crackers made from dough including dehydrated garlic were judged to be as good as those for batch no. 1. None, however, were observed as having the lingering sulfite aftertaste often apparent in crackers made with sodium sulfite.

EXAMPLE IV

English muffins were prepared by a straight dough process using the following standard formulation except that 1.25 lbs. of BASIC 602 dehydrated garlic was substituted for 1.6 lbs of sultite-containing dough conditioner used in the control batch.

TABLE 2

| | English Muffins Formulation | |
|---|---|---|
| | Lbs. | |
| Ingredients | Control | Invention |
| BASIC 602 | — | 1.25 |
| Dough Conditioner-sulfite containing | 1.6 | — |
| Flour | 315 | 315 |
| Water | 245 | 255 |
| Sugar | 9.5 | 9.5 |
| NFDM | 3.2 | 3.2 |
| Yeast Food | 1.6 | 1.6 |
| Vinegar | 3.2 | 3.2 |
| Protease | 3.2 | — |
| Yeast | 1.8 | 1.8 |

TABLE 2-continued

| | English Muffins Formulation | |
|---|---|---|
| | Lbs. | |
| Ingredients | Control | Invention |
| Shortening | 3.2 | 3.2 |

The ingredients listed above were first mixed slowly for 1 minute to evenly distribute the dry materials in the water followed by high-speed mixing for 8 minutes, prior to adding 5.5 lbs of salt, 1.5 lbs of Mycoban and 28 and 30 lbs of water, respectively, to the control batch and dough batch containing garlic powder. The dough batches were then mixed slowly for 1 minute before mixing for 3 minutes at high speed. Afterwards the doughs were permitted to ferment at 80°–85° F. and griddled until done. The English muffins made in accordance with the present invention were judged to be generally superior to muffins of the control in that they resulted with a very uniform porosity. Moreover during processing the dough exhibited improved machinability, and a more uniform cup flow.

EXAMPLE V

Hot dog buns were made using a standard sponge-dough method using the following formulations:

TABLE 5

| | Hot Dog Buns Formulation | |
|---|---|---|
| | Lbs. | |
| Ingredients | Control | Invention |
| Sponge: | | |
| Flour | 80 | 80 |
| Water | 45 | 45 |
| Soy Oil | 6 | 6 |
| Yeast Food | .5 | .5 |
| SSL | .5 | .5 |
| Yeast | 2.5 | 2.5 |
| Monomul-D | .5 | .5 |
| Protease | .5 | .5 |
| Dough: | | |
| Basic 602 | — | 0.125 |
| Flour | 20 | 20 |
| Water | 10 | 11 |
| Salt | 2.25 | 2.25 |
| Yeast | 1 | 1 |
| Liquid Sugar | 18 | 18 |
| Vital Wheat Gluten | 2.5 | 2.5 |
| Bromitab | .125 | .125 |
| Calif. Tab | .0625 | .0625 |

During processing, the dough containing dehydrated garlic was observed to be easily machined and exhibited a uniform quality from batch to batch. Moreover, it required 2 minutes less mixing to be considered sufficiently developed for processing. The overall quality of the baked buns was judged to be at least as good as the buns made from the control dough batch.

EXAMPLE VI

Croissants have also been made from dough including dehydrated garlic in an otherwise standard formulation as listed below:

TABLE 6

| | Croissants Formulation | |
|---|---|---|
| Ingredients | | Lbs. |
| Flour | | 400 |

TABLE 6-continued

| Croissants Formulation | |
|---|---|
| Ingredients | Lbs. |
| Water | 200 |
| Non-fat Milk powder | 30 |
| Yeast | 32 |
| Butter | 40 |
| Salt | 6 |
| Dehydrated Garlic (BASIC 604) | 0.5 |

The above ingredients were mixed for 2 minutes at a low speed setting to incorporate the dry materials with the water followed by 2 minutes of high-speed mixing to form a dough into which 110 lbs of butter was folded. The resultant dough was retarded at 38°–45° F. in a cooler for 12 hours prior to make-up and sheeting.

During processing, it was observed that the the dough was ready for make-up and sheeting 4 hours quicker than doughs made from the same formulation but without garlic. Moreover, the dough was judged to be easier to make-up because it was more relaxed.

EXAMPLE VII

This test is a comparison of a dough conditioner composition comprising garlic and an inert material versus dehydrated garlic used alone as a dough conditioner. The following formulation was used as the basis for each batch of bread for purposes of this comparison. This formulation was modified, however, by the inclusion of specified amounts of dough conditioner on a percent by weight of flour basis as indicated in the tabulated results.

TABLE 7-A

| Formulation | |
|---|---|
| INGREDIENTS | GRAMS |
| Sponge: | |
| Bread Flour | 700 |
| Mineral Yeast Food | 5 |
| Compressed Yeast | 20 |
| Water | 420 |
| Dough: | |
| Bread Flour | 300 |
| Granulated Sugar | 40 |
| Non-fat Dry Milk | 40 |
| Salt | 20 |
| Bread Shortening | 30 |
| Water and Ice | 221 |
| Total Dough Weight | 1,796 |

Each dough batch was prepared using a standard 3½ hour sponge-dough method. The results are tabulated below:

TABLE 7-B

| | | Use Level (f.b.) % | Dough | | | | Bread | |
|---|---|---|---|---|---|---|---|---|
| | | | Water Absorpt. % | Mixing Time Minutes | Proof | | Specific Volume cc/grams | Quality Score Total |
| Dough Improver | Batch No. | | | | Height mm | Time Minutes | | |
| Control: | | | | | | | | |
| None | 1 | | 64.1 | 4 | 100.7 | 56 | 5.38 | 84¼ |
| Flavorless Garlic Powder: | | | | | | | | |
| None | 2 | 0.01 | 64.0 | 3½ | 102.7 | 57 | 5.26 | 84¼ |
| None | 3 | 0.05 | 64.3 | 3½ | 100.3 | 56 | 5.28 | 82½ |
| None | 4 | 0.10 | 64.3 | 3½ | 99.3 | 53 | 5.27 | 80½ |
| None | 5 | 0.15 | 64.6 | 3¼ | 100.0 | 56 | 5.33 | 76½ |
| Flavorless Garlic Powder: | | | | | | | | |
| None | 6 | 0.01 | 64.0 | 3½ | 100.0 | 54 | 5.34 | 83¼ |
| None | 7 | 0.05 | 64.3 | 3½ | 100.3 | 55 | 5.25 | 83¼ |
| None | 8 | 0.10 | 64.6 | 3 | 99.7 | 55 | 5.28 | 77½ |
| None | 9 | 0.15 | 64.6 | 3 | 101.0 | 58 | 5.31 | 79½ |
| Composition - 20% Flavorless Dehydrated Garlic/80% Unmodified Wheat Starch: | | | | | | | | |
| None | 10 | 0.05 | 64.0 | 3½ | 99.0 | 54 | 5.25 | 84¼ |
| None | 11 | 0.25 | 64.6 | 3½ | 101.3 | 59 | 5.37 | 81 |
| None | 12 | 0.50 | 65.0 | 3½ | 101.3 | 55 | 5.32 | 79½ |
| None | 13 | 1.00 | 65.2 | 3¼ | 101.0 | 58 | 5.23 | 75½ |

As shown by this data, the mixing time at medium speed for the dough batches to which the dough conditioner was added was reduced by at least 15 seconds to as much as a 1 minute, compared to the control. The resultant bread doughs were judged to exhibit very good handling properties. The doughs proofed to the desired height of 101±2 mm within 56±3 minutes and were judged to have a good volume, and equivalent quality upon baking. Overall, the dehydrated garlic used alone functioned equivalently to its use in composition.

EXAMPLE VIII

The following rheological evaluations were made to compare the relative effectiveness of conventional dough additives and the dough conditioners of the present invention. The methodology used to obtain the Farinograph data was the AACC method 54–21. The dough properties were also evaluated with a Brabender Extensigraph using the AACC Method 54–10.

TABLE 8-A
FARINOGRAPH DATA

| Dough Improver | Use Level (f.b.) % | Absorpt. % | Arrival Min. | Peak Min. | Depart. Min. | Stability Min. | M.T.I. B.U. |
|---|---|---|---|---|---|---|---|
| Control: | — | 56.1 | 1.0 | 13.5 | 38.0 | 37.0 | 10 |
| Basic 801 | 0.1 | 56.2 | 1.0 | 14.0 | 36.0 | 35.0 | 5 |
|  | 0.25 | 57.8 | 2.0 | 9.0 | 15.0 | 13.0 | 40 |
|  | 0.5 | 58.2 | 5.0 | 8.0 | 11.0 | 6.0 | 80 |
|  | 1.0 | 58.4 | 4.5 | 7.0 | 9.5 | 5.0 | 80 |
| Basic 600-0 | 0.01 | 56.2 | 1.0 | 14.5 | 39.0 | 38.0 | 5 |
|  | 0.25 | 57.2 | 2.0 | 10.0 | 22.0 | 20.0 | 20 |
|  | 0.5 | 57.6 | 2.0 | 10.5 | 17.5 | 15.5 | 30 |
|  | 1.0 | 57.7 | 3.0 | 10.0 | 14.5 | 11.5 | 50 |
| Basic 602 | 0.01 | 56.2 | 1.0 | 13.0 | 34.0 | 33.0 | 5 |
|  | .05 | 56.5 | 1.0 | 11.0 | 33.5 | 32.5 | 5 |
|  | .25 | 56.8 | 1.0 | 10.5 | 26.0 | 25.0 | 10 |
|  | .5 | 56.8 | 1.0 | 10.5 | 24.5 | 23.5 | 10 |
| Reddi-Sponge | 1.0 | 57.4 | 1.0 | 6.0 | 25.0 | 24.0 | 20 |
|  | 1.5 | 58.0 | 1.5 | 5.5 | 16.0 | 14.5 | 20 |
|  | 3.0 | 59.3 | 2.0 | 5.0 | 9.0 | 7.0 | 40 |
| -Cysteine | 20 ppm | 56.3 | 1.0 | 5.5 | 27.5 | 26.5 | 20 |
|  | 30 ppm | 56.6 | 1.0 | 4.5 | 21.5 | 20.5 | 20 |
|  | 45 ppm | 56.7 | 1.5 | 4.5 | 14.0 | 12.5 | 30 |
|  | 90 ppm | 58.2 | 1.5 | 4.5 | 9.0 | 7.5 | 60 |
| Sodium Bisulfate | 100 ppm | 58.7 | 1.5 | 3.0 | 5.0 | 3.5 | 60 |
| Reduce 150 | 0.5 | 57.3 | 1.0 | 4.5 | 22.0 | 21.0 | 20 |
|  | 0.75 | 58.3 | 1.5 | 4.5 | 13.5 | 12.0 | 30 |
|  | 1.0 | 59.0 | 2.0 | 4.5 | 11.5 | 7.0 | 40 |
| Protase | 0.125 | 56.1 | 1.0 | 12.0 | 36.0 | 35.0 | 5 |
|  | 0.25 | 55.5 | 1.0 | 8.0 | 26.0 | 25.0 | 10 |
|  | 0.5 | 55.0 | 1.0 | 5.5 | 28.5 | 27.5 | 20 |

The foregoing data indicates that dehydrated garlic dough conditioners exhibit a reducing effect on the mix-time of wheat dough systems when compared to the control. This is illustrated by decreased peak times and stabilities particularly at use-levels of garlic by weight of flour on the order of 0.25% and higher. The lower peak times correlate to reduced mix-times in that these figures represent the time required to develop maximum viscosity of the dough. Moreover, increased absorption was also observed at increasing use levels of dehydrated garlic. In general, the performance of the different dough conditioners was similar.

TABLE 8-B
EXTENSIGRAPH DATA

| Dough Improver | Use Level (f.b.) % | Resistance to Extension (BU) | | | Extensibility (cm) | | |
|---|---|---|---|---|---|---|---|
|  |  | 45 min. | 90 min. | 135 min. | 45 min. | 90 min. | 135 min. |
| Control | — | 545 | 790 | 895 | 18.0 | 12.1 | 13.0 |
| Basic 801 | 0.01 | 545 | 765 | 865 | 19.8 | 13.0 | 11.3 |
|  | 0.25 | 360 | 580 | 620 | 18.5 | 12.1 | 11.2 |
|  | 0.5 | 130 | 240 | 325 | 23.8 | 22.5 | 16.9 |
|  | 1.0 | 95 | 170 | 210 | 23.2 | 20.8 | 20.7 |
| Basic 600-0 | 0.01 | 540 | 690 | 875 | 17.7 | 12.4 | 10.7 |
|  | 0.25 | 450 | 670 | 700 | 20.0 | 15.4 | 13.2 |
|  | 0.5 | 310 | 485 | 540 | 21.0 | 16.0 | 13.6 |
|  | 1.0 | 310 | 460 | 520 | 20.5 | 16.0 | 14.8 |
| Basic 602 | 0.01 | 570 | 825 | 890 | 18.4 | 13.4 | 10.7 |
|  | 0.05 | 580 | 740 | 855 | 19.7 | 14.1 | 12.8 |
|  | 0.25 | 535 | 730 | 550 | 20.0 | 16.8 | 14.6 |
|  | 0.5 | 490 | 650 | 705 | 19.2 | 15.5 | 14.3 |
|  | 1.0 | 480 | 600 | 660 | 19.3 | 14.9 | 13.6 |
| Reddi Sponge | 1.0 | 330 | 480 | 400 | 21.0 | 19.4 | 17.7 |
|  | 1.5 | 250 | 365 | 430 | 22.8 | 21.5 | 19.3 |
|  | 3.0 | 150 | 310 | 530 | 24.6 | 19.7 | 12.4 |
| L-Cysteine | 20 ppm | 310 | 410 | 400 | 22.5 | 20.1 | 20.0 |
|  | 30 ppm | 290 | 355 | 320 | 21.5 | 20.7 | 20.5 |
|  | 45 ppm | 225 | 240 | 250 | 24.8 | 24.4 | 23.1 |
|  | 90 ppm | 100 | 110 | 145 | 23.4 | 25.4 | 23.5 |
| Sodium Bisulfite | 100 ppm | 35 | 50 | 70 | 23.2 | 20.6 | 17.8 |
| Reduce 150 | 0.5 | 265 | 300 | 315 | 23.5 | 21.6 | 22.3 |
|  | 0.75 | 150 | 215 | 250 | 27.2 | 24.6 | 23.5 |
|  | 1.0 | 100 | 135 | 165 | 19.0 | 22.6 | 23.3 |
| Protase | 0.125 | 585 | 710 | 835 | 18.4 | 15.3 | 13.1 |
|  | 0.25 | 515 | 655 | 710 | 19.8 | 17.0 | 17.7 |
|  | 0.5 | 560 | 540 | 600 | 18.5 | 18.0 | 19.0 |

The Extensigraph data indicates that the resistance to extension of all doughs decreased with increasing levels of the dough conditioners. Related to this, the extensibility of all doughs were improved by the use of dough conditioners at all levels evaluated.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. The method for making dough products comprising:

providing a dough formulation comprising substantially flavorless dehydrated garlic in an effective amount to function as a dough conditioner, flour, leavening agent, and water; and mixing said formulation for a time sufficient to develop a dough.

2. The method of claim 1 wherein substantially flavorless dehydrated garlic is in a form selected from the group consisting of granules, powder and agglomerates.

3. The method of claim 1 wherein said effective amount is an amount up to about 1.0% by weight of said flour.

4. The method of claim 3 wherein said garlic is incorporated into the formulation in an amount up to about 0.5% by weight of said flour.

5. The method of claim 4 wherein said effective amount is an amount up to about 0.3% by weight of said flour.

6. The method of claim 5 wherein said effective amount is between about 0.01 to 0.3% by weight of said flour.

7. The method of claim 6 wherein said effective amount is between about 0.01 to 0.05% by weight of said flour.

8. The method of claim 6 wherein said effective amount is between about 0.05 to 0.25% by weight of said flour.

9. The method of claim 1 wherein said time sufficient to develop a dough is less than the time required to develop a dough which does not contain said substantially flavorless dehydrated garlic.

10. The method of claim 1 wherein said mixing to develop a dough is performed as a step of a process selected from the group consisting of a sponge-dough process, a straight-dough process and a brew process.

11. The method of claim 1 further comprising heating said dough in an oven to produce a baked product.

12. The method of claim 11 wherein said baked product is selected from the group consisting of bread loaves, rolls, buns, crackers, biscuits, muffins, pizza, sweet goods, pastry, croissants, tortillas, and pretzels.

* * * * *

UNITED STATES PATENT AND TRADEMARK OFFICE
CERTIFICATE OF CORRECTION

PATENT NO. : 4,643,900

DATED : February 17, 1987

INVENTOR(S) : Roy W. Porter

It is certified that error appears in the above-identified patent and that said Letters Patent is hereby corrected as shown below:

In the Abstract, line 15, "products" should read -- product --.

Column 1, line 40, after "dough" insert -- . --.

Column 1, line 45, "exhibits" should read -- exhibit --.

Column 7, line 8, "suplemental" should read -- supplement --.

Column 7, line 61, after "some" delete "a".

Column 8, line 4, delete "above".

Column 17, line 10 of Table 6, place -- 0.5 --, for Dehydrated Garlic... under the "6 (Lbs.)" same table line 11, delete "0.5".

Column 19, line 20 (Table 8-A) "-cystene" should read -- L-cystene --.

Column 19, line 24 (Table 8-A) "Sodium Bisulfate" should read -- Sodium Bisulfite --.

Signed and Sealed this

Twenty-fifth Day of October, 1988

Attest:

DONALD J. QUIGG

Attesting Officer     Commissioner of Patents and Trademarks